(12) United States Patent
Looije et al.

(10) Patent No.: US 6,334,768 B1
(45) Date of Patent: Jan. 1, 2002

(54) BLOW MOLDING CLAMP ARRANGEMENT

(75) Inventors: Peter A. Looije, Newmarket; David Geiger, Bolton; Anthony Sabapathy, Scarborough, all of (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/372,180

(22) Filed: Aug. 11, 1999

(51) Int. Cl.$^7$ .............................................. B29C 49/56
(52) U.S. Cl. .................. 425/541; 425/451.7; 425/451.9
(58) Field of Search ................................ 425/541, 595, 425/451.7, 451.9

(56) References Cited

U.S. PATENT DOCUMENTS

| | | | |
|---|---|---|---|
| 4,304,540 A | 12/1981 | Hammon | 425/150 |
| 4,504,208 A | 3/1985 | Kurumaji et al. | 425/589 |
| 4,594,067 A | * 6/1986 | Langos | 425/451.9 |
| 4,786,245 A | * 11/1988 | Windstrup et al. | 425/541 |
| 4,874,309 A | 10/1989 | Kushibe et al. | 425/589 |
| 5,135,385 A | 8/1992 | Fukuzawa et al. | 425/595 |
| 5,320,517 A | 6/1994 | Hirata et al. | 425/589 |
| 5,338,171 A | 8/1994 | Hayakawa et al. | 425/138 |
| 5,417,913 A | 5/1995 | Arend | 264/328.1 |
| 5,624,695 A | 4/1997 | Glaesener et al. | 425/589 |
| 5,720,918 A | * 2/1998 | Wollschlager et al. | 425/541 |
| 5,730,927 A | * 3/1998 | Radar et al. | 425/541 |
| 5,853,773 A | 12/1998 | Choi | 425/136 |
| 5,928,685 A | * 7/1999 | Schad | 425/451.9 |
| 5,975,881 A | * 11/1999 | Langos et al. | 425/541 |

FOREIGN PATENT DOCUMENTS

| | | |
|---|---|---|
| CH | 418535 | 2/1967 |
| DE | 1155885 | 10/1963 |
| DE | 3323931 | 1/1985 |
| DE | 4412883 | 10/1995 |
| DE | 1009484 | 5/1997 |
| EP | 0513572 | 11/1992 |
| FR | 1548751 | 12/1968 |
| FR | 2256828 | 8/1975 |
| FR | 2390271 | 12/1978 |
| GB | 1299781 | 12/1972 |
| GB | 1477098 | 6/1977 |
| GB | 2064415 | 6/1981 |
| GB | 2315310 | 1/1998 |
| JP | 5-24086 | 2/1993 |
| WO | 93/16828 | 9/1993 |
| WO | WO 9641711 | 12/1996 |

OTHER PUBLICATIONS

Derwent Abstract vol. 11, No. 28 (M–557) (2475) of Japan 61–199,920 dated Sep. 1986.

* cited by examiner

*Primary Examiner*—Robert Davis
(74) *Attorney, Agent, or Firm*—Katten Muchin Zavis

(57) ABSTRACT

A blow clamp for a blow molding apparatus having first and second platens movable between a closed and an open position. The blow clamp includes at least two clamping piston nuts secured to the first platen and respective tie bars secured to the second platen for registering with the clamping piston nuts. The tie bars are rotatable by an actuator between engaging and disengaging configurations. In the engaging configuration the tie bars are axially fixed relative to the clamping piston nuts. In the disengaging configuration the tie bars are freely axially movable relative to the clamping piston nuts. Means are provided to apply an axial closing force to the clamping piston nuts in which force is transferred to the tie bars through engagement with the clamping piston nuts in the clamping configuration.

18 Claims, 5 Drawing Sheets

BLOW MOLDING CLAMP ARRANGEMENT

FIELD OF THE INVENTION

This invention relates to a blow molding apparatus, and more specifically, to blow clamps for securing an opposed pair of moveable platens to one another during blowing.

BACKGROUND OF THE INVENTION

In the blow molding of plastics to make containers and other articles, a "parison" or "preform" is first clamped between mold halves mounted to opposite platens of a blow molding machine. Pressurized air is then introduced into the parison or preform to cause it to stretch, through inflation, to conform to a mold surface defined between the mold halves. The blown part is allowed to cool, the mold halves separated and the blown part removed.

During blowing, the opposite halves of the blow molding machine are held together by a "blow clamp" which both locks the two halves together and applies a force urging the two halves toward one another to counter blowing forces acting to separate the mold halves. Although a fluid pressure actuable cylinder may be used for the blow clamp, this is not an ideal arrangement as the necessary clamping forces require a rather substantial cylinder which is relatively slow and energy inefficient for most of its stroke which requires simply opening and closing the blow mold rather than applying a clamping force. Preferably also the blow clamp should separate upon mold opening so as not to interfere with the removal of blown parts. This is not possible with a fluid pressure actuable cylinder. PCT application PCT/EP96/02507 illustrates and describes a novel clamping arrangement with certain unique advantages. The clamping arrangement includes rows of teeth on the machine tie bars which can be moved into and out of engagement with corresponding rows of teeth on respective clamping nuts. The tie rods are rigidly secured to one platen and the clamping nuts to the opposite platen. The tie rod nuts are provided with rotation means and axial force means. The clamping process involves first rotating the tie rods to engage the clamping nuts and then applying, via a hydraulically actuated piston, an axial force to the tie rods which is transferred to the opposite platen through engagement between the corresponding teeth on the tie rods and the clamping nuts.

The arrangement described in the above PCT application does have a couple of drawbacks. Firstly, the teeth on the tie bars are part way along the tie bars, toward the middle of the tie bar and accordingly, the ends of the tie bars remain in the clamping nuts even when the mold platens are moved apart. This poses interference problems with any stripping apparatus. Additionally, application of rotational and axial forces to the tie rods requires a significant amount of torque to overcome the friction resisting rotation caused by the hydraulic seals in the piston associated with the clamping nut. Furthermore, the entire tie rod assembly is quite complex and expensive to manufacture as it includes apparatus for rotating the tie rods, separate apparatus for taking up clearance between the interengaging teeth and still further apparatus for applying the clamping force.

It is an object of the present invention to provide a blow clamp arrangement which separates to enhance access to the associated blow molds for loading and stripping purposes.

It is a further object of the present invention to provide a blow clamp arrangement which does not require both rotational and axial movement of the tie rods.

It is a still further object of the present invention to provide a blow clamp arrangement which doesn't require any rotation of any hydraulically actuable piston or cylinder components for engagement and disengagement.

SUMMARY OF THE INVENTION

A blow clamp for a blow molding apparatus having first and second platens movable between a closed and an open position. The blow clamp includes at least two clamping piston nuts secured to the first platen and respective tie bars secured to the second platen for registering with the clamping piston nuts. The tie bars are movable between an engaging and a disengaging configuration. In the engaging configuration the tie bars are secured against axial movement relative to the clamping piston nuts. In the disengaging configuration, the tie bars are freely axially movable relative to the clamping piston nuts. An actuator is provided for moving the tie bars between the engaging and the disengaging configurations. A clamping force applicator is associated with the clamping piston nuts for applying an axial closing force to the clamping piston nuts. The clamping piston nuts and tie bars may have radially extending teeth which engage in the engaging position and do not engage in the disengaging position.

The actuator may cause the tie bars to rotate. A single actuator may rotate more than one tie bar simultaneously either through direct connection or through linkage interconnecting a plurality of tie bars. The actuator may be a motor or a hydraulically actuable piston.

The clamping piston nuts may include a fluid pressure actuable piston for applying the axial closing force to the clamping piston nuts.

Preferably, the clamping piston nuts and tie bars separate during mold opening by an amount sufficient to permit passage of a pallet track therebetween.

DESCRIPTION OF DRAWINGS

Preferred embodiments of the invention as described below with reference to the accompanying drawings in which.

DESCRIPTION OF PREFERRED EMBODIMENTS

Figure 1:
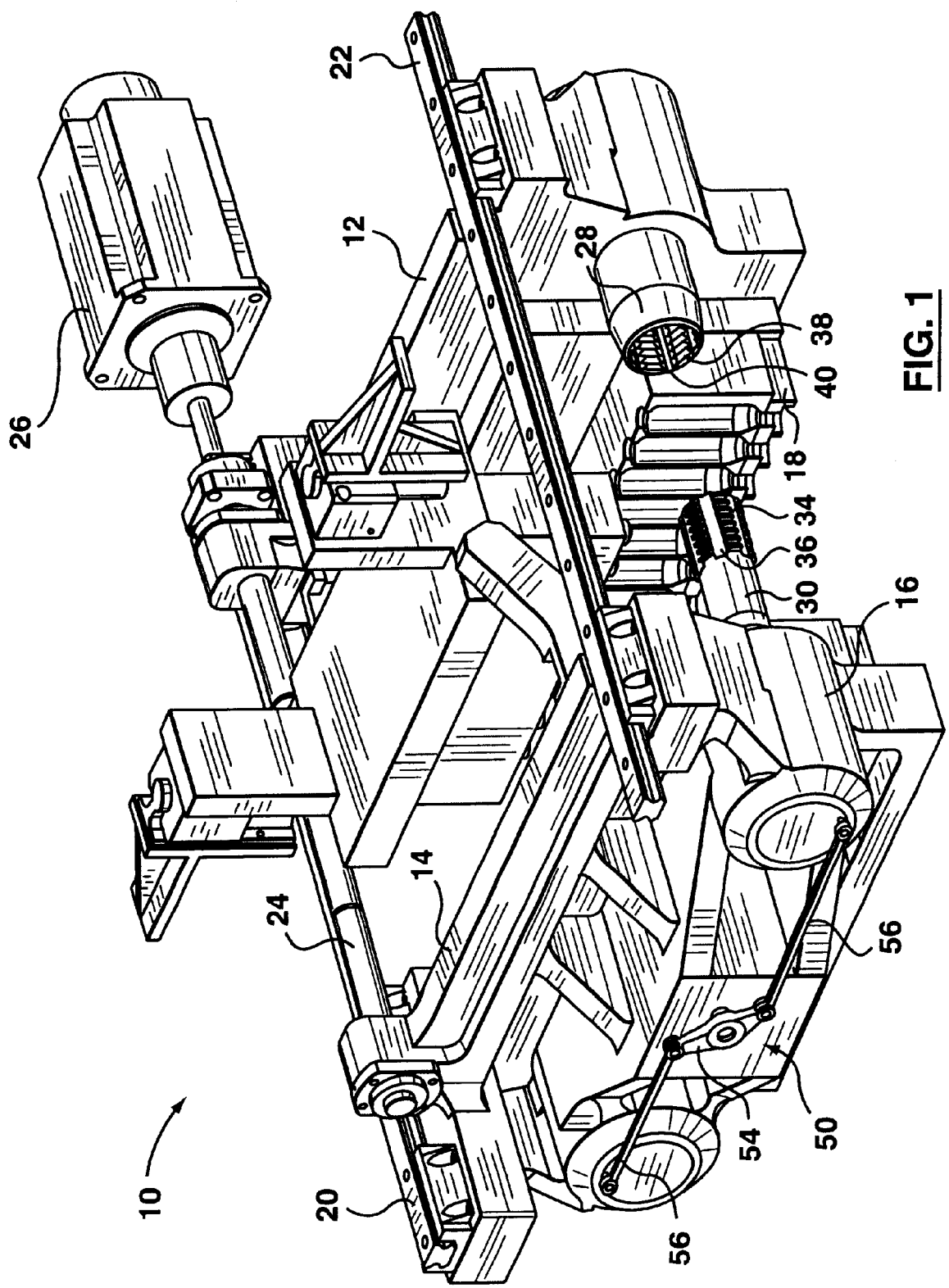
FIG. 1 is an isometric view of a blow molding apparatus having a blow clamp according to the present invention.

A blow molding apparatus is generally indicated by reference 10 in the accompanying drawings. The blow molding apparatus has first and second platens, 12 and 14 respectively which are movable from an open position illustrated in FIG. 1 to a closed position illustrated in FIG. 2.

Respective mold halves 16 and 18 are secured to the first and second platens. The first and second platens, 12 and 14 respectively are slidable along fixed rails 20 and 22 and are moved between the closed and open positions by a ball screw drive 24 actuated by a motor 26.

Housed in the first platen 12 are a pair of clamping piston nuts 28. Although two clamping piston nuts 28 are illustrated, it will be appreciated that other numbers are possible and may be desirable in some circumstances.

Respective tie bars 30 corresponding to the two clamping piston nuts are secured to and extend from the second platen 14. The tie bars 30 are rotatable about respective longitudinally extending tie bar axes 32 but are generally immovable in an axial direction relative to the second platen 14.

The tie bars 30 have radially outwardly extending teeth 34 which are arranged in rows separated by longitudinally extending spaces 36. The clamping piston nuts 28 have radially inwardly extending teeth 38 arranged in rows separated by spaces 40. The breadth and location of the spaces 36 and 40 are such as to allow the teeth 34 and 38 to respectively pass therebetween when the teeth 36 and 40 are aligned therewith. This corresponds to a disengaging configuration of the tie bars 30 as the teeth 34 and 38 do not engage one another.

The tie bars 30, in their disengaging configuration, will slide into the clamping piston nuts 28 upon mold closure. The tie bars may then be moved by rotation about their respective axes 32, into an engaging configuration in which the teeth 34 on the tie bars 30 align with and thereby engage the teeth 38 on the clamping piston nuts 28.

In the engaging configuration the tie bars 30 are secured against axial movement relative to the clamping piston nuts 28 by the engagement between the teeth 34 and 38.

Figure 2:
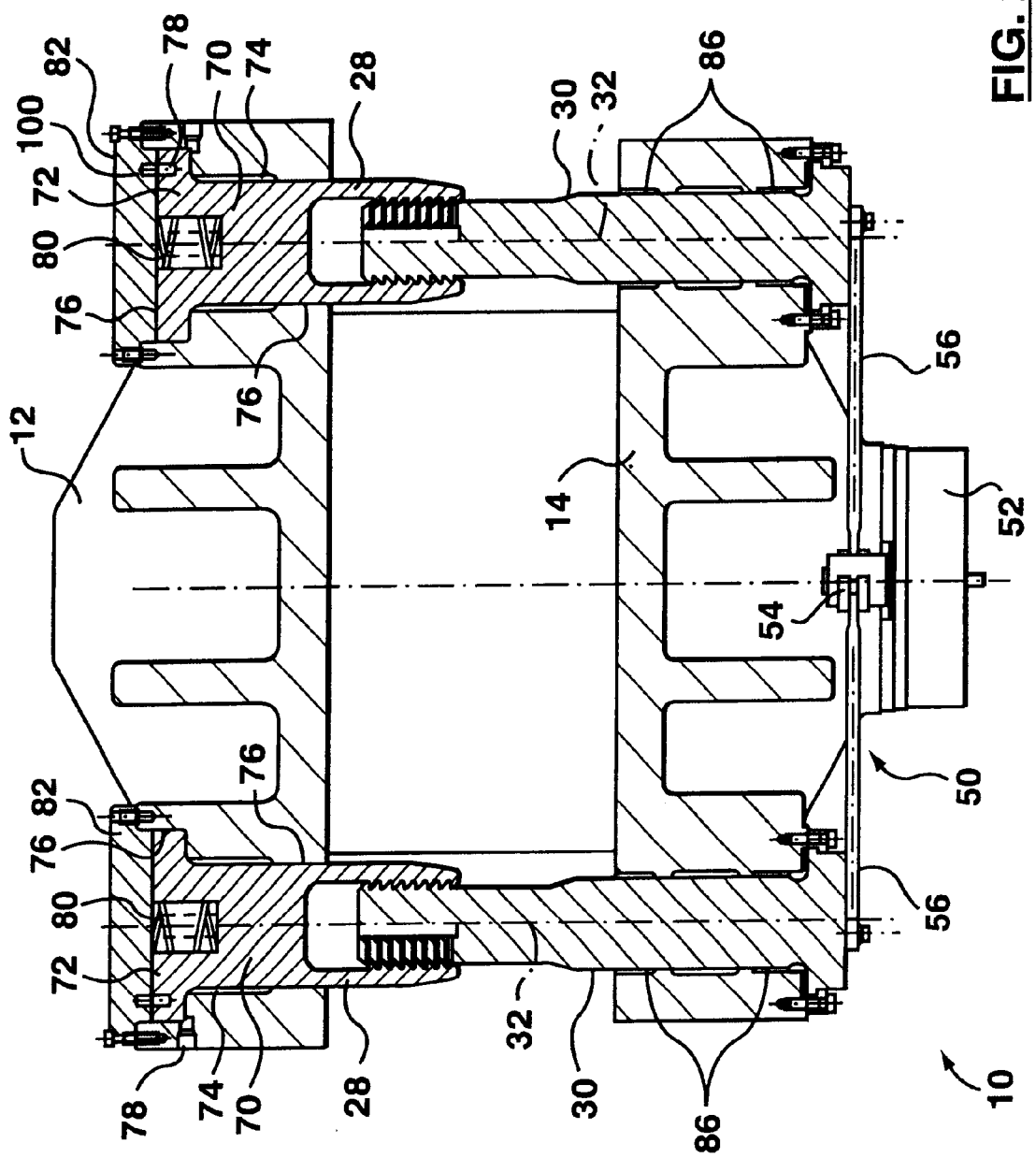
FIG. 2 is a top plan view, partially cut away, of a blow molding apparatus having a blow clamp according to the present invention.
Figure 3:
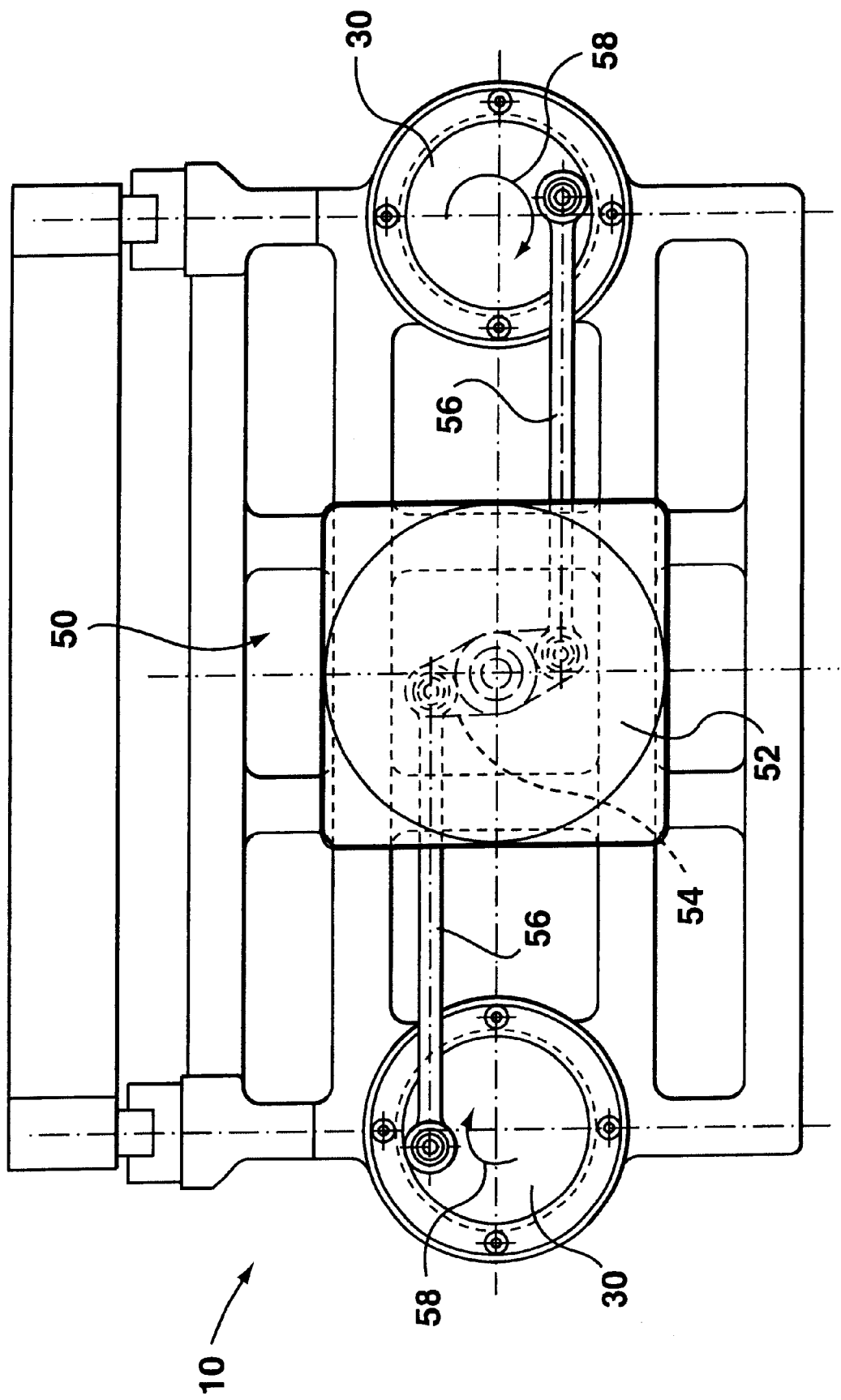
FIG. 3 is a rear elevation of the blow molding apparatus of FIG. 2 showing an actuator.
Figure 4:
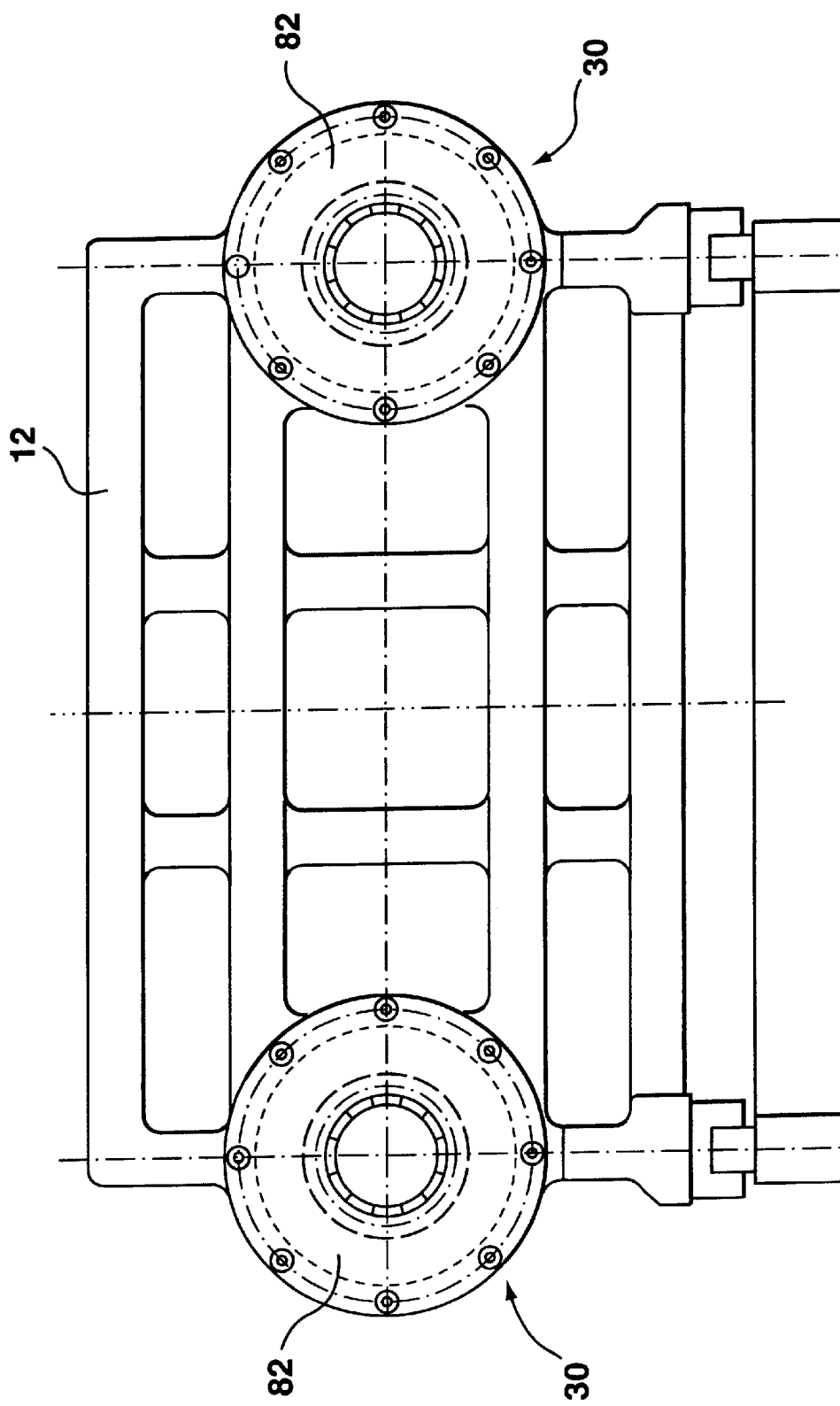
FIG. 4 is a front elevation of the blow molding apparatus of FIG. 2.

The tie bars 30 are rotated between the engaged and disengaged configuration, by an actuator assembly, generally indicated by reference 50 in FIGS. 1, 2 and 3. An alternate embodiment for the actuator assembly is generally indicated by reference 60 in FIG. 5. The actuator assembly 50 in FIGS. 1, 2 and 3 includes an actuator such as motor 52 connected to the tie bars 30 by a linkage made up of a crank 54 and linkage arms 56. Rotation of the motor 52 causes the tie rods 30 to rotate in the direction of arrows 58. The actuator 50 is directly coupled to the tie bars 30 in that each tie bar 30 is connected via its own linkage 54 and 56 to the motor 52.

Figure 5:
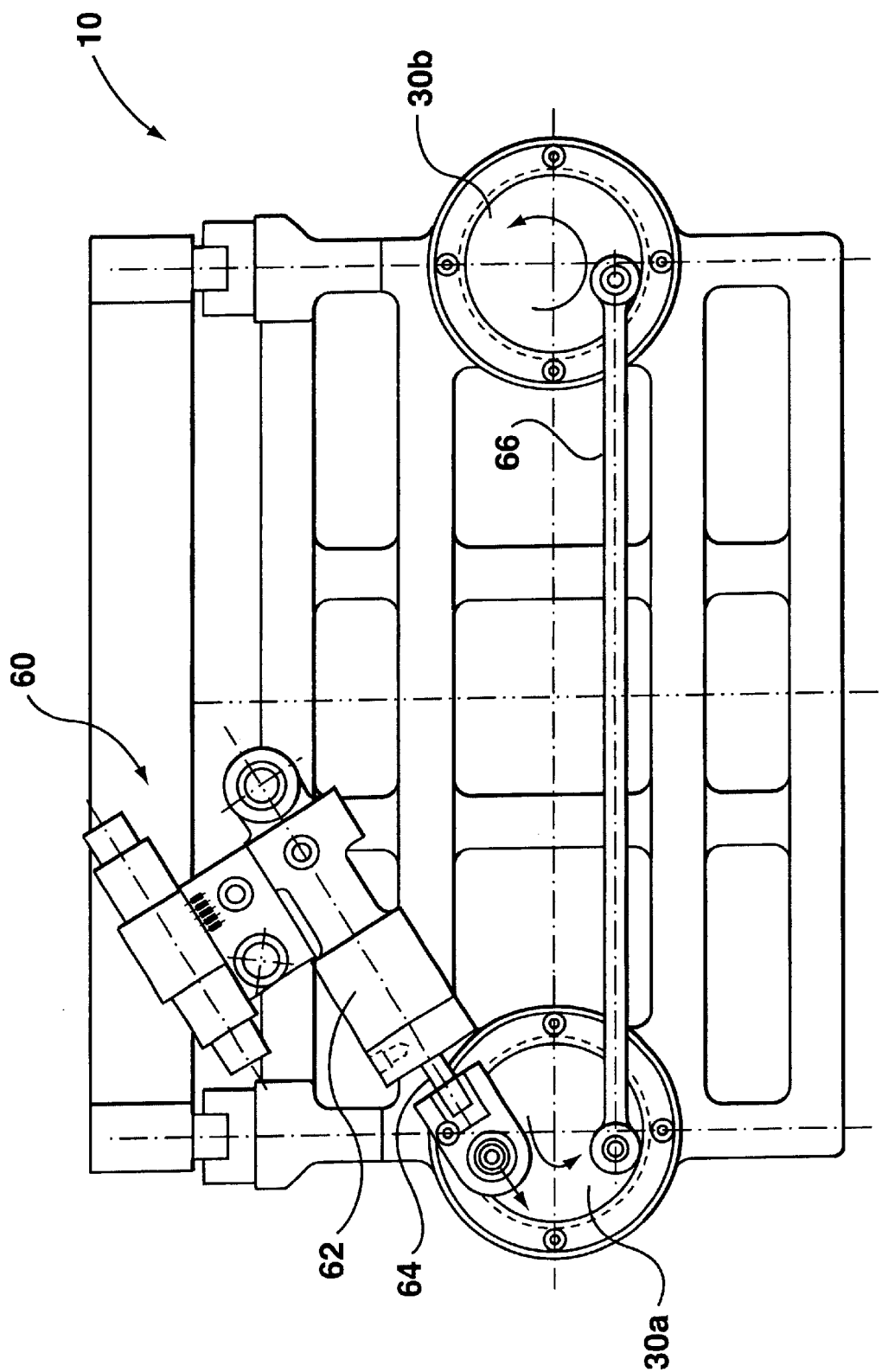
FIG. 5 is an end elevation corresponding to FIG. 3 of a blow molding apparatus but showing an alternate embodiment of an actuator.

FIG. 5 illustrates an alternate actuator arrangement 60 according to which one of the tie bars 30a is directly coupled to a fluid pressure cylinder 62 having a hydraulically actuable piston coupled via a rod 64. The tie bar 30a and another tie bar 30b are coupled for simultaneous rotation via a linkage arm 66. In this arrangement one tie bar 30a is directly coupled to the cylinder 62 which acts as an actuator and the other tie bar 30b is indirectly coupled to the actuator as it receives rotational input by coupling to the tie bar 30a rather than directly to the actuator or cylinder 62.

According to the present invention a clamping force is applied to the tie bars 30 by clamping piston nuts 28. As shown in FIG. 2, the clamping piston nuts have a shank 70 with an enlarged end or "piston" 72, both of which slidingly engage a similarly configured bore 74. At each end of the bore 74 are seals 76 which provide a fluid seal between the clamping piston nuts 28 and the bore 74 in a manner such as used in hydraulic cylinders. A port 78 is provided for each clamping piston nut 28 to admit pressurized fluid between the piston 72 and the bore 70 to urge the clamping piston nuts 28 away from the tie bars 30 thereby exerting a clamping force forcing the first platen 12 and second platen 14 toward each other. Powel 100 prevents piston nut 28 from rotating during engagement/disengagement of the tie bar.

A spring 80 may be provided to return the clamping piston nut 28 to its initial position upon release of fluid pressure at the ports 78. A cap 82 acts as a limiting stop for movement of the piston 72 and provides a member against which the spring 80 may act.

The tie bars 30 may be mounted to the second platen 14 by bearings 86 to minimize rotational friction between the tie bars 30 and the second platen 14.

It will be appreciated that the blow clamp configuration of the present invention eliminates the application of both rotational and translational forces to one component of a blow clamp. Accordingly, the structure presented eliminates the frictional resistance associated with rotating a piston within a hydraulic seal and any wear associated with such an arrangement. Furthermore, the blow clamp of the present invention presents two relatively simple structures, namely, the rotatable tie bars 30 and axially movable clamping piston nuts 28 rather than the complex combined rotating/translating arrangement described above with respect to the prior art structure.

It will also be appreciated that as the teeth are toward an outermost end of the tie bars 30, the tie bars 30 and clamping piston members 28 disengage and separate upon mold opening. Preferably, the tie bars 30 and clamping piston nuts 28 will separate by an amount sufficient so as to not interfere with the passage of a pallet track (not illustrated) therebetween.

The above embodiments are intended in an illustrative rather than a restrictive sense. Variations may be apparent to persons skilled in such structures without departing from the spirit and scope of the present invention as defined by the claims set out below.

I claim:

1. A blow clamp for a blow molding apparatus having first and second platens movable between a closed position and an open position, said blow clamp comprising:

at least two clamping piston nuts housed in said first platen;

respective tie bars secured to said second platen for registering with said clamping piston nuts;

said tie bars being movable between an engaging configuration in which each said tie bar is secured against axial movement relative to said clamping piston nuts and a disengaging configuration in which said tie bars are freely axially movable relative to said clamping piston nuts;

an actuator for moving said tie bars between said engaging and said disengaging configurations; and, a clamping force applicator associated with said clamping piston nuts for applying an axial closing force to said clamping piston nuts.

2. A blow clamp according to claim 1 wherein:

said clamping piston nuts and said tie bars have radially extending teeth;

in said engaging configuration said teeth on said tie bars engage said teeth on respective of said clamping piston nuts; and, in said disengaging configurations, said teeth on said tie bars do not engage said teeth on said clamping piston nuts.

3. A blow clamp according to claim 2 wherein said actuator causes said tie bars to rotate about respective tie bar axes in moving said tie bars between said engaging and disengaging configurations.

4. A blow clamp according to claim 3 wherein:

said teeth on said tie bars and said clamping piston nuts are arranged in longitudinally extending rows separated by longitudinally extending spaces; and, in said disengaged configuration said spaces between said rows of teeth on said tie bars allowing passage of said teeth on said clamping piston nuts and said spaces between said rows of teeth on said clamping piston nuts allowing passage of said teeth on said tie bars.

5. A blow clamp according to claim 4 wherein:

said clamping piston nuts include a fluid pressure actuable piston for applying said axial closing force to said clamping piston nuts.

6. A blow clamp according to claim 5 wherein said actuator is directly coupled to said tie bars.

7. A blow clamp according to claim 5 wherein said actuator is directly connected to at least one of said tie bars and indirectly coupled to at least another of said tie bars via a linkage extending from said at least one of said tie bars.

8. A blow clamp according to claim 6 wherein said actuator is a motor.

9. A blow clamp according to claim 7 wherein said actuator is a hydraulically actuable piston.

10. A blow clamp according to claim 9 wherein said tie bars and said clamping piston nuts separate during mold opening by an amount sufficient to permit passage of a pallet track therebetween.

11. A blow clamp for a blow molding apparatus having a first and second platen movable between a closed position and an open position, said blow clamp comprising:

a plurality of clamping piston nut means housed in said first platen for applying a clamping force;

respective tie bars secured to said second platen for registering with said plurality of clamping piston nut means;

said tie bars being movable between an engaging position in which said tie bar is secured against axial movement relative to said clamping piston nut means and a disengaging position in which said tie bars are freely movable relative to said clamping piston nut means;

an actuator for moving said tie bars between said engaging and disengaging positions; and, a clamping force applicator associated with said clamping piston nut means for applying said clamping force.

12. The blow clamp according claim 11 wherein:

said clamping piston nut means and said tie bars have radially extending teeth;

in said engaging position said teeth on said tie bars engage said teeth on respective said clamping piston nut means; and, in said disengaging configurations, said teeth on said tie bars do not engage said teeth on said clamping piston nut means.

13. The blow clamp according to claim 11 wherein said teeth on said clamping piston nut means engage said teeth on respective said tie bars without axial movement of said platens.

14. The blow clamp according to claim 11 wherein said actuator causes said tie bars to rotate about respective tie bar axes when engaging said teeth on said clamping piston nut means with said teeth on respective said tie bars.

15. The blow clamp according to claim 11 wherein each said clamping piston nut means is in communication with a pressurized fluid for the selectable application of said clamping force.

16. The blow clamp according to claim 15 wherein each said clamping piston nut means has an enlarged end in fluid communication with said pressurized fluid.

17. The blow clamp according to claim 16 further comprising a respective biasing means in communication with each said clamping piston nut means for returning said clamping piston nut means to an initial position following release of said pressurized fluid.

18. The blow clamp according to claim 17 wherein said biasing means is a spring.

* * * * *